(12) United States Patent
Green

(10) Patent No.: US 9,947,123 B1
(45) Date of Patent: *Apr. 17, 2018

(54) TRANSFER OF RIGS WITH TEMPORAL COHERENCE

(71) Applicant: Pixar, Emeryville, CA (US)

(72) Inventor: Brian Green, Walnut Creek, CA (US)

(73) Assignee: Pixar, Emeryville, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 14/170,835

(22) Filed: Feb. 3, 2014

Related U.S. Application Data

(63) Continuation of application No. 12/325,898, filed on Dec. 1, 2008, now Pat. No. 8,643,654.

(60) Provisional application No. 61/030,796, filed on Feb. 22, 2008.

(51) Int. Cl.
*G06T 13/00* (2011.01)
*G06T 13/20* (2011.01)
*G06T 13/40* (2011.01)

(52) U.S. Cl.
CPC .............. *G06T 13/00* (2013.01); *G06T 13/20* (2013.01); *G06T 13/40* (2013.01); *G06T 2213/00* (2013.01)

(58) Field of Classification Search
CPC ......... G06T 13/40; G06T 17/20; G06T 19/00; G06T 13/00; G06T 2219/2021
See application file for complete search history.

(56) References Cited

U.S. PATENT DOCUMENTS

| 8,026,917 B1* | 9/2011 | Rogers ............... G06T 13/40 345/419 |
| 8,269,779 B2 | 9/2012 | Rogers et al. |
| 2006/0262119 A1 | 11/2006 | Isner |
| 2007/0176923 A1 | 8/2007 | Lee et al. |
| 2008/0024487 A1* | 1/2008 | Isner ................ G06T 13/40 345/420 |
| 2008/0136814 A1* | 6/2008 | Chu ................. G06T 13/40 345/419 |

FOREIGN PATENT DOCUMENTS

WO 2007/087445 A2 8/2007

OTHER PUBLICATIONS

Orvalho, Verónica Costa Teixeira, Ernesto Zacur, and Antonio Susin. "Transferring Facial Expressions to Different Face Models." SIACG. 2006.*

(Continued)

*Primary Examiner* — Gregory J Tryder
*Assistant Examiner* — Scott E Sonners
(74) *Attorney, Agent, or Firm* — Kilpatrick Townsend & Stockton LLP

(57) ABSTRACT

In various embodiments, a user can create or generate objects to be modeled, simulated, and/or rendered. The user can apply a mesh to the character's form to create the character's topology. Information, such as character rigging, shader and paint data, hairstyles, or the like can be attached to or otherwise associated with the character's topology. A standard or uniform topology can then be generated that allows information associated with the character to be transfer to other characters that have a similar topological correspondence.

20 Claims, 5 Drawing Sheets

(56) References Cited

OTHER PUBLICATIONS

Eck, M. et al., "Multiresolution Analysis of Arbitrary Meshes," SIGGRAPH '95: Proceedings of the 22.sup.nd Annual Conferences on Computer Graphics and Interactive Techniques, ACM Press, pp. 173-1782. Year Published: 1995.
Floater, M.S. et al., "Surface Parameterization: a Tutorial and Survey," Advances in Multiresolution for Geometric Modeling, N.A. Dodgson et al. (eds.), Springer: Berlin, pp. 157-186, Year Published: 2005.
Joshi, P. et al., "Harmonic Coordinates for Character Articulation," ACM Transactions on Graphics, Jul. 2007, vol. 26, No. 3, Article 71, pp. 71-1-71-9.
Kahler, K. et al., "Head shop: Generating animated head models with anatomical structure," Proceedings of the 2002 ACM SIGGRAPH/Eurographic Symposium on Computer Animation, 2002, 9 pages.
Lee, A.W.F. et al., "Multiresolution Mesh Morphing," SIGGRAPH 99: Proceedings of the 26.sup.th Annual Conference on Computer Graphics and Interactive Techniques, ACM Press/Addison-Wesley Publishing Co., pp. 343-350, Year Published: 1999.
Praun, E. et al., "Consistent Mesh Parameterizations," SIGGRAPH 2001 Proceedings of the 28.sup.th Annual Conference on Computer Graphics and Interactive Techniques, ACM Press, pp. 179-184, Year Published: 2001.

\* cited by examiner

TRANSFER OF RIGS WITH TEMPORAL COHERENCE

CROSS-REFERENCES TO RELATED APPLICATIONS

This application is a continuation of application Ser. No. 12/325,898, filed Dec. 1, 2008, which application claims the benefit of and priority to U.S. Provisional Patent Application No. 61/030,796, filed Feb. 22, 2008 and entitled "Transfer of Rigs with Temporal Coherence," the entire disclosure of which is herein incorporated by reference for all purposes.

BACKGROUND

This disclosure relates to computer animation and computer generated imagery. More specifically, this disclosure related to techniques for transferring information from one computer model to another.

With the wide-spread availability of computers, animators and computer graphics artists can rely upon computers to assist in the animation and computer generated imagery process. This may include using computers to have physical models be represented by virtual models in computer memory. This may also include using computers to facilitate animation, for example, by the designing, posing, deforming, coloring, painting, or the like, of characters or other elements of a computer animation display.

Pioneering companies in the computer-aided animation/computer generated imagery (CGI) industry can include Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms specially designed for computer animation and CGI, now known as RenderMan®. RenderMan® is now widely used in the film industry and the inventors of the present invention have been recognized for their contributions to RenderMan® with multiple Academy Awards®.

One core functional aspect of RenderMan® software can include the use of a "rendering engine" to convert geometric and/or mathematical descriptions of objects or other models into images. This process is known in the industry as "rendering." For movies or other features, a user (e.g., an animator or other skilled artist) specifies the geometric description of a model or other objects, such as characters, props, background, or the like that may be rendered into images. An animator may also specifying poses and motions for objects or portions of the objects. In some instances, the geometric description of objects may include a number of animation variables (avars), and values for the avars.

The production of animated features and CGI may involve the extensive use of computer graphics techniques to produce a visually appealing image from the geometric description of an object or model that can be used to convey an element of a story. One of the challenges in creating models for use in animated features can be balancing the desire for a visually appealing image of a character or other object with the practical issues involved in allocating the computational resources required to produce those visually appealing images. Often the geometric descriptions of objects or models at various stages in a feature film production environment may be rough and course, lacking the realism and detail that would be expected of the final production.

Computer generated imagery and animation typically can involve creating models for objects that are elements of a scene. One aspect of creating a model for use in computer generated imagery and animation can be to construct the object in a true 3-dimensional coordinate system. Sometimes, objects can be sculpted, much like real clay or plaster, working from general forms to specific details with various sculpting tools. Often, a model can be created by applying or fitting a topology (e.g., using a mesh of geometrical vertices, faces, and edges) to an object's form.

In a process called rigging, models can be given various controllers, animation variables, and handles for an animator to manipulate various locations of the object's topology to create complex movements and motions. For some models, a bone/joint system can be set up to deform various locations of the object's topology. For example, the bone/joint system can be connected to foot, ankle, knee, hip, and other leg locations of a humanoid model to provide the structure to make the humanoid model walk. Other types of information may also be "hung" on the object's topology to add further realism or additional control for the animator. In other words, information may be associated with a vertex, edge, span, or face of the mesh that forms to the object's topology. However, the above processes can be very involved and time consuming to simply generate a single model.

Additionally, a typical feature-length animation may require hundreds to thousands of model. This increase the production time and cost of the animation if each model may be required to be hand created and setup. One possible solution can be to hand copy the information from one model to another. However, this process still requires an animator to place or "hang" the copied data onto the correct position of the new objects topology. Rarely are each characters exactly the same, so each character's topology can have some differences that the animator has to deal with.

One issue with the production process is the time and effort involved when an animator undertakes to create the geometric description of a model and the models associated avars, rigging, shader variables, paint data, or the like. Even with models that lack the detail and realism expected of the final production, it may take several hours to several days for an animator to design, rig, pose, paint, or otherwise prepare the model for a given state of the production process. Further, although the model need not be fully realistic at all stages of the production process, it can be desirable that the animator or artist producing the model be able to modify certain attributes of the model at any stage. However, modifying the model during the production process may also involved significant time and effort. Often, there may not be sufficient time for desired modifications in order to maintain a release schedule.

Accordingly, what is desired are improved methods and apparatus for solving some of the problems discussed above, while reducing further drawbacks, some of which are discussed above.

BRIEF SUMMARY

In various embodiments, an animator can create or generate a model of an original object. The animator may apply or fit a mesh to the object's form to create the object's topology. Information, such as character rigging, shader and paint data, hairstyles, or the like can be attached to or otherwise associated with the object's topology. The animator then can create a standard or uniform topology based on the current object's topology.

In some embodiments, the standard topology can be applied or fitted to any number of object forms that an animator wishes to be topologically similar to the original object. The standard topology allows the information originally associated with the original object to be transfer the other object fitted with the standard topology using topological correspondence.

In various embodiments, information can be transferred from the original object by projection to a new object using the standard topology. For example, using topological correspondence, the location of hair or fur can be transferred to the new object. Since the original hairstyle "projected" from hair locations, the new hairstyle can take reference of any changes in the object's form and automatically readjust while maintaining the original hairstyles overall style. In some embodiments, transferred information can be "auto-fitted." For example, rigging can be transferred from one character to another using topological correspondence. In response to volumetric differences between the original object and the new object, the rigging can automatically readjust itself to the new form.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF EXEMPLARY EMBODIMENTS

Techniques and tools can be implemented that assist in the production of computer animation and computer graphics imagery. A mesh can be the structure that gives shape to a model. The mesh of a model may include, in addition to information specifying vertices and edges, various additional pieces of information. In various embodiments, point weight groups, shader variables, articulation controls, hair variables and styles, paint data, or the like, can be shared between meshes having at least a portion of identical or similar topologies. Information associated with the mesh of one character can be shared with or transferred to the mesh of another character.

Figure 1:
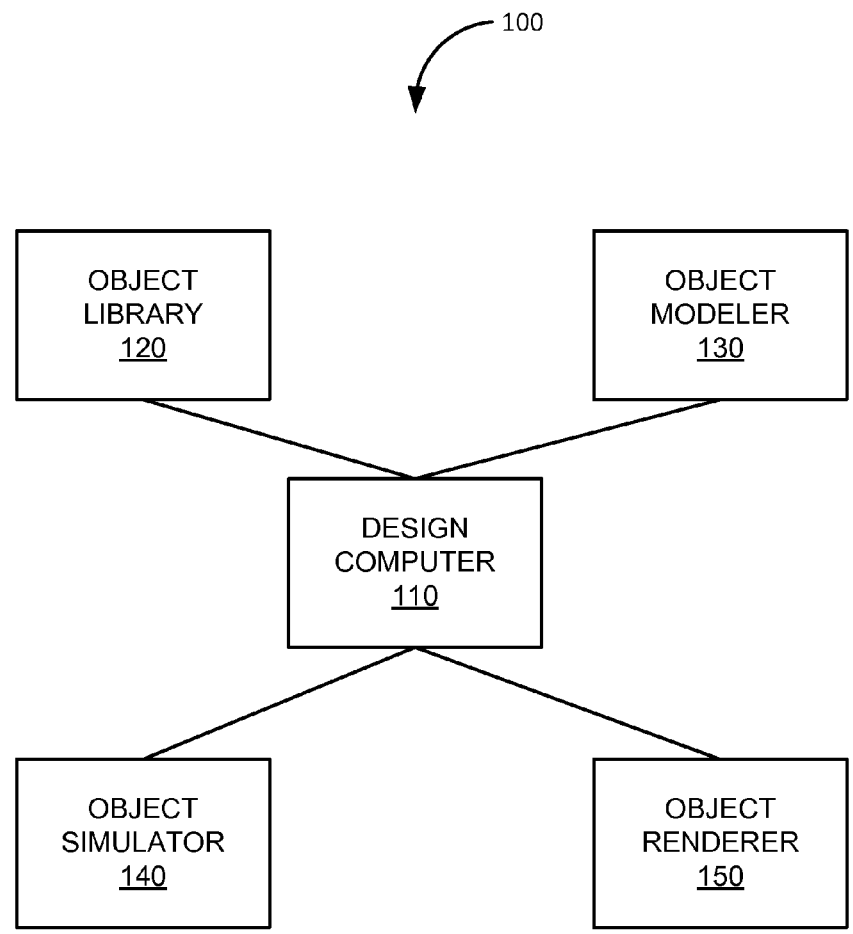
FIG. 1 is a simplified block diagram of a system for creating computer animations and computer graphics imagery that may incorporate embodiments of those inventions found within this disclosure.

FIG. 1 is a simplified block diagram of system 100 for creating computer graphics imagery and animation that may incorporate embodiments of those inventions found within this disclosure. In this example, system 100 includes design computer 110, object library 120, object modeler 130, object simulator 140, and object render 150.

Design computer 110 can be any PC, laptop, workstation, mainframe, cluster, or the like. Object library 120 can be any database configured to store information related to objects that may be designed, posed, animated, simulated, rendered, or the like.

Object modeler 130 can be any hardware and/or software configured to model objects. Object modeler 130 may generate 2-D and 3-D object data to be stored in object library 120. Object simulator 140 can be any hardware and/or software configured to simulate objects. Object simulator 140 may generate simulation data using physically-based numerical techniques. Object renderer 150 can be any hardware and/or software configured to render objects. For example, object renderer 150 may generate still images, animations, motion picture sequences, or the like of objects stored in object library 120.

Figure 2:
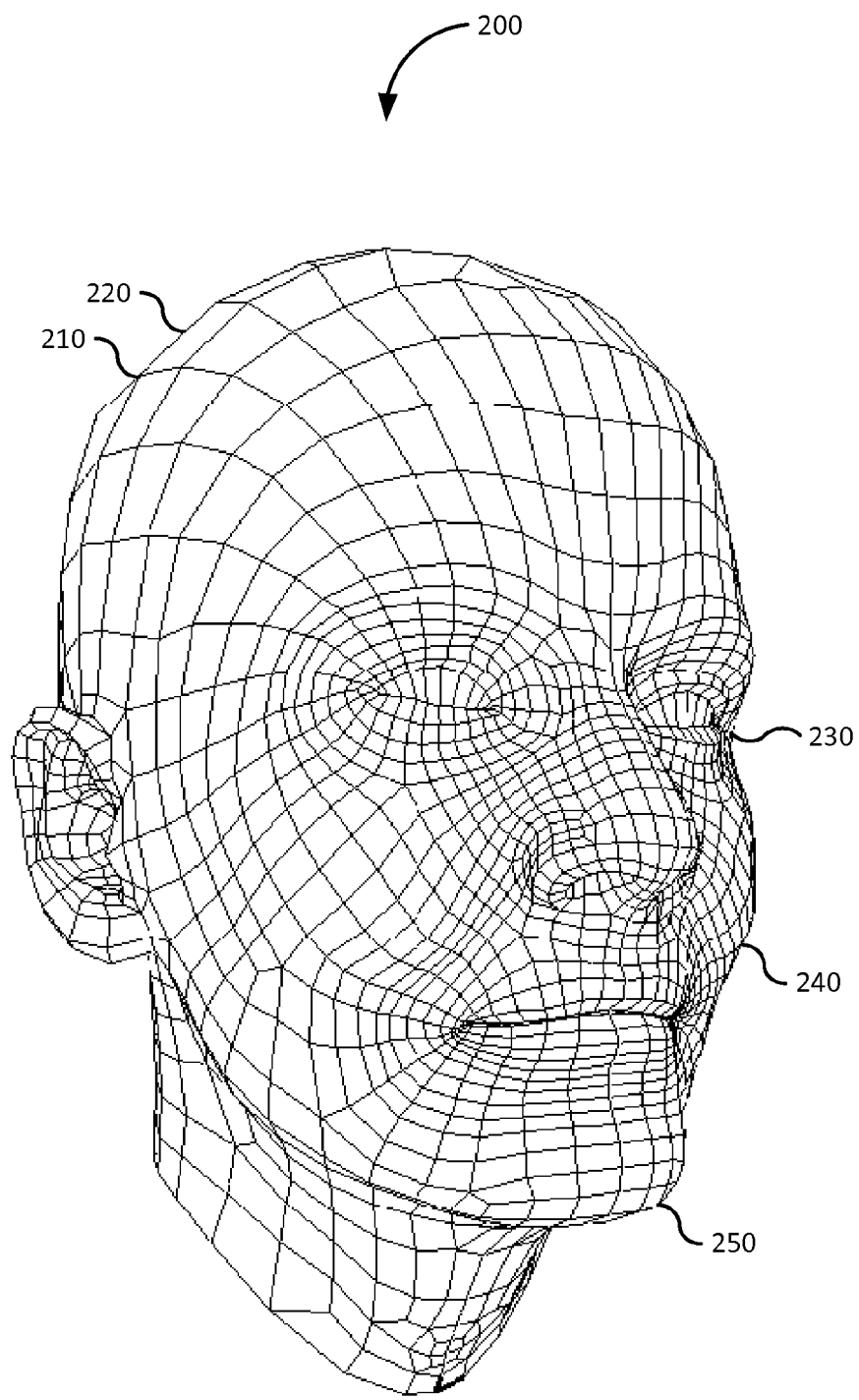
FIG. 2 is an illustration of a mesh for a head of a human character.

FIG. 2 is an illustration of mesh 200 for a head of a human character model in one embodiment. Mesh 200 can be created or modeled as a collection of faces (e.g., triangles, quadrilaterals, or other polygons), formed by interconnecting a collection of vertices. In this example, a collection of polygons interconnect at vertex 210. Polygons may interconnect at vertex 210 to share an edge (e.g., edge 220). Any number of polygons and vertices may be used to form mesh 200. The number of polygons may be dependent on user preference, the desired topology, geometry, realism, detail, or the like.

Motion of a model associated with mesh 200 may be realized by controlling mesh 200, for example by controlling vertices 230, 240, and 250. Polygons and vertices of mesh 200 may be individually animated by moving their location in space (x, y, z) for each displayed frame of a computer animation. Polygons and vertices of mesh 200 may also move together as group, maintaining constant relative position. Thus, for example, by raising vertices of mesh 200 by appropriate amounts at the corners of lips on the head of the human character, a smiling expression can be formed. Similarly, vertices of mesh 200 located at or near features or other prominent aspects of the model created by mesh 200, such as eyebrows, cheeks, forehead, etc. may be moved to deform the head of the human character to form a variety of expressions.

In addition to controlling character deformations, information can be "attached to" mesh 200 to provide other functional and/or decorative purposes. For example, mesh 200 may be connected to skeletons, character rigging, or other animations controls and avars used to animate, manipulate, or deform the model via mesh 200. Further, fields of data and/or variables specifying color, shading, paint, texture, etc. can be located at certain vertices or defined over surfaces of mesh 200. As discussed above, constructing mesh 200 and placing all of this information on mesh 200 can be a time consuming process. This process may limit how many characters or other objects may be created, the topologies and geometries of those models, and what changes can be made during various stages in the production of animations, such as feature-length films.

Figure 3A:
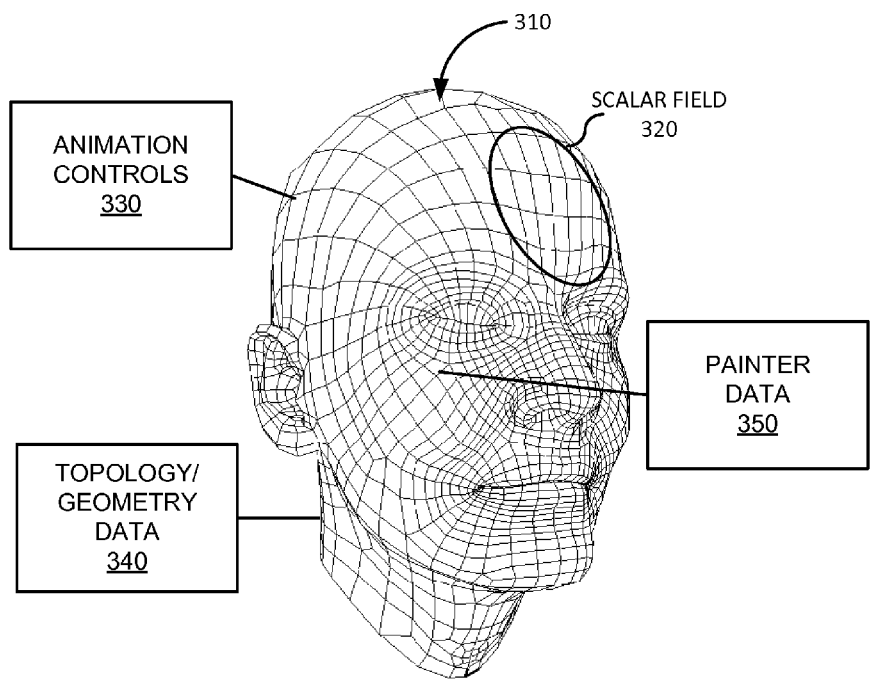
FIG. 3A is an illustration a mesh including various pieces of associated information.

FIG. 3A is an illustration mesh 310 including various pieces of associated information. Mesh 310 can include scalar field 320, animations controls 330, topology/geometry data 340, and painter data 350. Scalar field 320 may include a distribution of values or variables over a portion of mesh 310. The values or variables associated with scalar field 320 may include shader variables, point weight groups, the location of hair/fur objects, or the like. Topology/geometry data 340 may include information that defines or describes a locality in terms of its layout, structure, or level of detail. Painter data 350 may include information, such as coloring and textures, placed by an animator or designer at a specific location on mesh 310.

In various embodiments, new models can be created and existing models can be more readily updated using techniques of this disclosure that allow animators to overcome some of the timing constraints involved in creating models. Additionally, the time and effort put into designing one model can be preserved allowing the prior work and effort performed by the animator to be shared with or copied to another model. In some embodiments, a standard or uniform topology can be created that allows information present at or on a mesh to be shared with another mesh. Fitting the standard topology to objects can reduce the time required to create new models, or the update existing models at later stages of the production process. Thus, animation controls, rigging, shader and paint data, etc. can be authored once on a character, and shared or transferred to different version of the same character or to another character fitted with the authored topology.

In the example of FIG. 3A, mesh 310 may represent a template or master version of one or more characters. For example, mesh 310 may include a number of polygons that provide a character with just enough detail with which an animator, designer, or other graphics artist may work. The number of polygons may be changed in the template or master version for a final or production version of the character having lifelike or the final desired detail and/or realism.

Figure 3B:
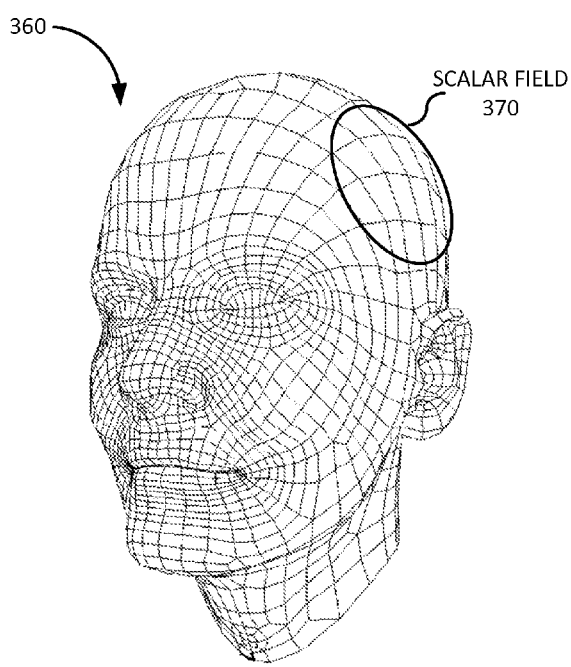
FIG. 3B is an illustration of a mesh in various embodiments with which information associated with the mesh of FIG. 3A may be shared.

Referring to FIG. 3B, mesh 360 may represent another character or another version of the character. Mesh 360 may include a portion having the same or substantially identical number of polygons with respect to the template or master versions of the character. In this example, mesh 360 can include scalar field 370. Scalar field 370 may be identical to, similar to, or otherwise include some relationship with scalar field 320. For example, both may represent how the head of the character is to be shaded or how hair is to be placed.

In various embodiments, objects may be fitted with a standard topology. The standard topology can be created to allow information associated with mesh 310 as the standard or master, for example, to be readily shared with or transferred to other meshes that share the a common topology, such as mesh 360. Scalar field 320, animations controls 330, topology/geometry data 340, and/or painter data 350 can be transferred between mesh 310 and mesh 360. For example, scalar field 320 can be transferred to mesh 360 to create scalar field 370. Thus, once meshes are fitted with the standard topology, any information at or on one mesh fitted with the standard topology may be shared with another mesh also fitted with the standard topology.

Figure 4:
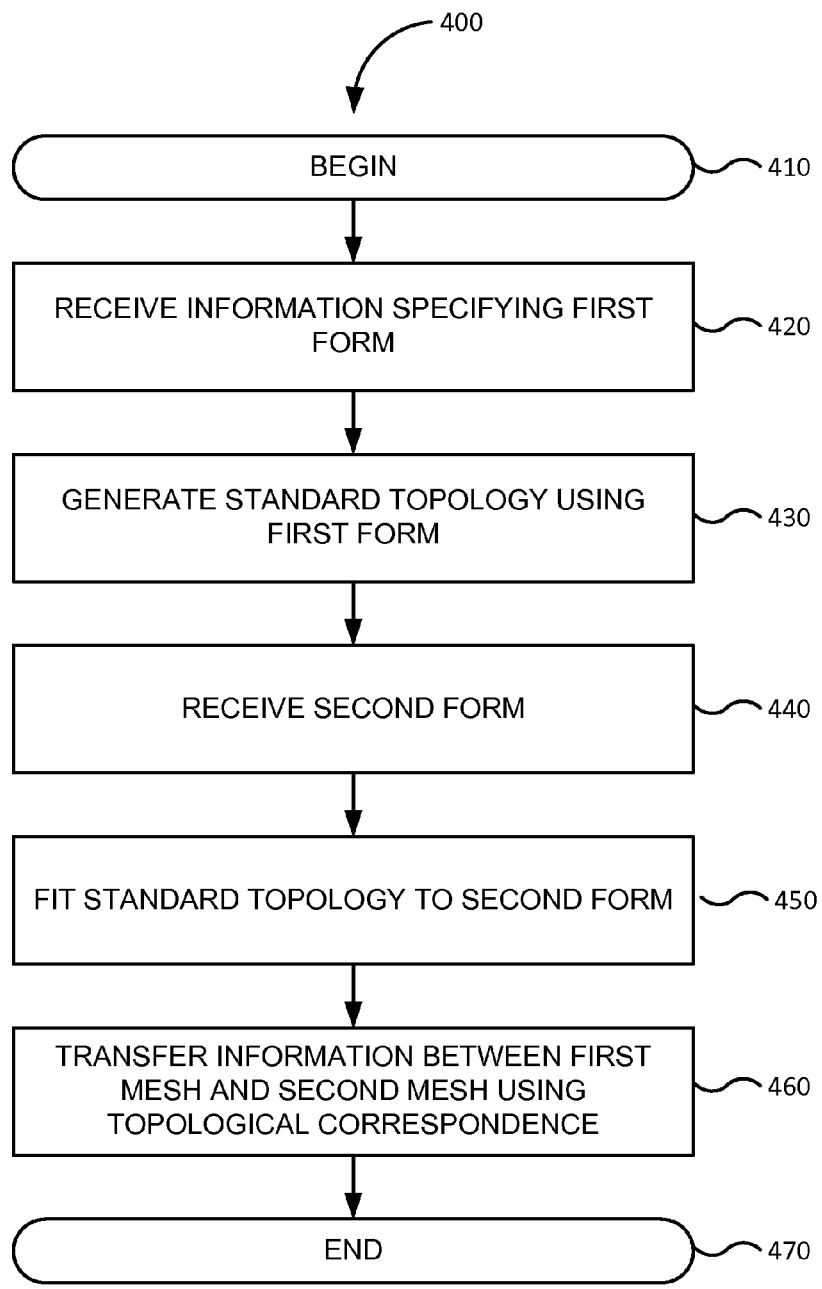
FIG. 4 is a simplified flowchart of a method in various embodiments for transferring information using a standard topology in one embodiment according to the present invention.

FIG. 4 is a simplified flowchart of method 400 in various embodiments for generating a correspondence between meshes for sharing information between the meshes. The processing depicted in FIG. 4 may be performed by software modules (e.g., instructions or code) executed by a processor of a computer system, by hardware modules of an electronic device, or combinations thereof. FIG. 4 begins in step 410.

In step 420, information specifying a first form is received. In one example, a computer artist sculpts a 3-dimensional form of an object. In another example, a physical model or sculpture of a character is scanned using one or more scanning techniques to generate 3-dimensional information indicative of the physical form.

In step 430, a topology is created using the first form. For example, a mesh can be fitted to the first object form to generate the object's topology. In one example, the mesh can be fitted to the object form after the form is generated. In another example, the mesh can be fitted or applied to the object form by drawing spans on a physical representation of the object, such as a sculpture or photo. The object and spans may be then scanned to simultaneously generate the form and object's topology.

In some embodiments, the mesh can be designated as a standard topology or master rig to be applied to subsequent forms. After setup of a character, the mesh can be marked, identified, used, and applied as the standard topology or master rig for other objects and characters that a user or modeler desires. These other objects or characters may be fitted with the standard topology or master rig and thus share a common topology.

With the standard topology as a template or master rig, information associated with the standard topology can be shared or transferred to these other characters. For example, a skeleton may be created and rigging associated with the topology for animating the object. In another example, paint and shader data can be associated with various points, curve, surface regions, or the life, of the topology. In yet another example, animation controls or variables are associated with various locations of the object's topology. In one embodiment, the transfer process may be bi-directional, allowing information to be added to the standard topology or master rig and other information to be shared with other objects from the standard topology.

In step 440, information specifying a second object form is received. In step 450, the standard topology or master rig is fitted or applied to the second object form to generate the object's topology. In various embodiments, a user or modeler can load the standard topology along with the second object form. The user may push, pull, or tweak the standard topology around the form or otherwise fits the topology such that the standard topology fits the second form. In some embodiments, the standard topology may be fitted using one or more automatic fitting procedures.

In step 460, information associated with the first object form, such as character rigging, paint data, shader data, etc. is transferred to the second object form using a topology correspondence. The topological correspondence can include functions, relationships, correlations, etc. between one or more points associated with the first mesh and one or more points associated with the second mesh. The topological correspondence may include a mapping from every location on or within a space near the first mesh to a unique location on or near the second mesh.

In various embodiments, a correspondence may be generated between each vertex in a portion of a first mesh and a corresponding vertex in a portion of a second mesh. The correspondence may map one or more points, curves, surfaces, regions, objects, or the like, associated with the first object to one or more points, curves, surfaces, regions, objects, or the like associated with the second object.

In various embodiments, transfer of character rigging can be achieved with weight fields. Using the standard topology, the exact weighting of an original form is transferred to a new form using topological correspondence provided by fitting the standard topology to the new form. Shading can include scalar fields, which are also weight fields that can be transferred topologically. Additionally, UV sets can be transferred using topological correspondence.

In further embodiments, painting can be transferred using topological correspondence. In one example, painting data can be incorporated into UV sets, which are transferred between characters. Thus, painted portions of one character can be reused on others.

In some embodiments, hair can be created using scalp meshes. Hairstyles can be transferred between characters as the scalp meshes can be fitted topologically. This projection of information allows the scalp meshes to automatically readjust the new form, while maintaining the originally sculpted hairstyle.

A collision system may use a hand crafted weight response to colliding objects, which can be transferred to other objects. In some examples, extra geometry can be created for a character, such as standins and collision bodies. The extra geometry can be built once, and transferred to other characters using topological correspondence.

In various embodiments, transferred information can be "auto-fitted." For example, due to volumetric differences between objects, skeletons, joints, character rigging and the like can automatically readjust in response the volumetric differences.

Accordingly, any information that can be "hung" on the mesh can be transferred. In some embodiments, a user may want to click on the surface of an object and have a pickable pop up allowing the user to do an operation, such as moving a part of the surface or invising it. These pickables, vis objects, or the like can be transferred using the topological correspondence provided by the standard topology. FIG. 4 ends in step 470.

Figure 5:
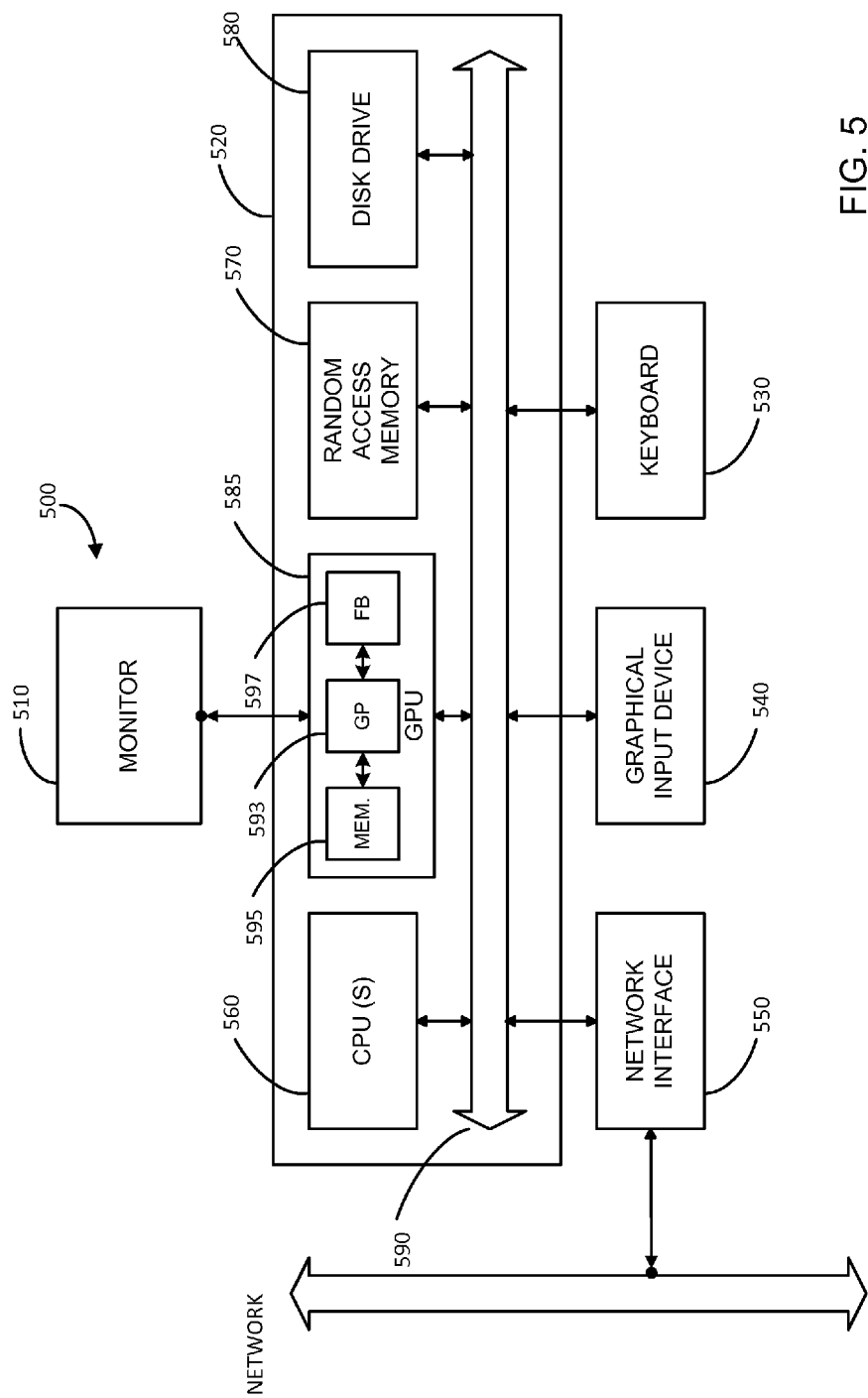
FIG. 5 is a block diagram of a computer system that may be used to practice embodiments of the present invention.

FIG. 5 is a block diagram of computer system 500 that may be used to implement or practice various embodiments of an invention whose teachings may be presented herein. FIG. 5 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 500 can include monitor 510, computer 520, keyboard 530, user input device 540, computer interfaces 550, or the like. Monitor 510 may typically include familiar display devices, such as a television monitor, a cathode ray tube (CRT), a liquid crystal display (LCD), or the like. Monitor 510 may provide an interface to user input device 540, such as incorporating touch screen technologies.

Computer 520 may typically include familiar computer components, such as processor 560 and one or more memories or storage devices, such as random access memory (RAM) 570, one or more disk drives 580, graphics processing unit (GPU) 585, or the like. Computer 520 may include system bus 590 interconnecting the above components and providing functionality, such as inter-device communication.

In further embodiments, computer 520 may include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. Further, computer 520 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system.

In various embodiments, user input device 540 may typically be embodied as a computer mouse, a trackball, a track pad, a joystick, a wireless remote, a drawing tablet, a voice command system, an eye tracking system, or the like. User input device 540 may allow a user of computer system 500 to select objects, icons, text, user interface widgets, or other user interface elements that appear on monitor 510 via a command, such as a click of a button or the like.

In some embodiments, computer interfaces 550 may typically include a communications interface, an Ethernet card, a modem (telephone, satellite, cable, ISDN), (asynchronous) digital subscriber line (DSL) unit, FireWire interface, USB interface, or the like. For example, computer interfaces 550 may be coupled to a computer network, to a FireWire bus, a USB hub, or the like. In other embodiments, computer interfaces 550 may be physically integrated as hardware on the motherboard of computer 520, may be implemented as a software program, such as soft DSL or the like, or may be implemented as a combination thereof.

In various embodiments, computer system 500 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 500.

RAM 570 and disk drive 580 are examples of machine-readable articles or computer-readable media configured to store information, such as computer programs, executable computer code, human-readable source code, shader code, rendering engines, or the like, and data, such as image files, models including geometrical descriptions of objects, ordered geometric descriptions of objects, procedural descriptions of models, scene descriptor files, or the like. Other types of computer-readable storage media or tangible machine-accessible media include floppy disks, removable hard disks, optical storage media such as CD-ROMS, DVDs and bar codes, semiconductor memories such as flash memories, read-only-memories (ROMS), battery-backed volatile memories, networked storage devices, or the like.

In some embodiments, GPU 585 may include any conventional graphics processing unit. GPU 585 may include one or more vector or parallel processing units that may be user programmable. Such GPUs may be commercially available from NVIDIA, ATI, and other vendors. In this example, GPU 585 can include one or more graphics processors 593, a number of memories and/or registers 595, and a number of frame buffers 597.

As suggested, FIG. 5 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may include techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for sharing information between three-dimensional objects, the method comprising:
receiving, at one or more computer systems, information specifying a first three-dimensional object having a first form;
generating, using the one or more computer systems, a first mesh for the first three-dimensional object, the first mesh having a first number of vertices interconnected to each other in a first topology to fit the first form, wherein the first topology includes a structure and a level of detail;
receiving, at the one or more computer systems, information specifying a second three-dimensional object having a second form;
fitting the first mesh to the second form of the second three-dimensional object to generate a second mesh for the second three-dimensional object, wherein the second mesh has the first number of vertices and has the same structure and the same level of detail as the first mesh, and each vertex of the second mesh has a one-to-one correspondence with a respective vertex of the first mesh;
identifying, with one or more processors associated with the one or more computer systems, information defined for a first set of vertices on a first portion of the first mesh; and
transferring, with the one or more processors associated with the one or more computer systems, the information defined for each respective vertex of the first set of vertices on the first portion of the first mesh to a corresponding vertex of a second set of vertices on a second portion of the second mesh that corresponds to the first portion of the first mesh.

2. The method of claim 1 further comprising:
generating, with the one or more processors associated with the one or more computer systems, a master topology for three-dimensional objects based on the first portion of the first mesh; and
modifying a plurality of meshes based on the master topology for a plurality of three-dimensional objects having the same type as the first three-dimensional object;
wherein modifying each respective mesh of the plurality of meshes includes transferring the information defined for the first set of vertices on the first portion of the first mesh to a set of vertices on a portion of the respective mesh that correspond to the first set of vertices on the first portion of the first mesh.

3. The method of claim 2 further comprising:
fitting the master topology to the portion of each respective mesh of the plurality of meshes.

4. The method of claim 3 wherein fitting the master topology comprises receiving input from a user indicative of where to fit the master topology.

5. The method of claim 3 wherein fitting the master topology comprises fitting the master topology using one or more fitting procedures.

6. The method of claim 1 wherein the information defined for the first set of vertices on the first portion of the first mesh comprises one or more of shader variables, articulation controls, hair variables, hair styles, or paint data.

7. The method of claim 1 further comprising:
generating, with the one or more processors associated with the one or more computer systems, a master rig based on the information defined for the first set of vertices on the first portion of the first mesh; and
transferring, with the one or more processors associated with the one or more computer systems, the information defined for the first set of vertices on the first portion of the first mesh to a plurality of versions of the master rig based on the first topology.

8. The method of claim 7 further comprising transferring, with the one or more processors associated with the one or more computer systems, information between the master rig and the plurality of versions of the master rig in a bi-directional manner.

9. A non-transitory computer-readable medium storing code executable by a processor of a computer system for sharing information between computer-generated objects, the non-transitory computer-readable medium comprising:
  code for receiving information specifying a first computer-generated object having a first form;
  code for generating a first mesh for the first computer-generated object, the first mesh having a first number of vertices interconnected to each other in a first topology to fit the first form, wherein the first topology includes a structure and a level of detail;
  code for receiving information specifying a second computer-generated object having a second form;
  code for fitting the first mesh to the second form of the second computer-generated object, wherein the second mesh has the first number of vertices and has the same structure and the same level of detail as the first mesh, and each vertex of the second mesh has a one-to-one correspondence with a respective vertex of the first mesh;
  code for identifying information defined for a first set of vertices on a first portion of the first mesh; and
  code for transferring the information defined for each respective vertex of the first set of vertices on the first portion of the first mesh to a corresponding vertex of a second set of vertices on a second portion of the second mesh that corresponds with the first portion of the first mesh.

10. The non-transitory computer-readable medium of claim 9 further comprising:
  code for generating a master topology for computer-generated objects based on the first portion of the first mesh; and
  code for modifying a plurality of meshes based on the master topology for a plurality of computer-generated objects having the same type as the first computer-generated object associated with the first mesh;
  wherein the code for modifying each respective mesh of the plurality of meshes includes code for transferring the information defined for the first set of vertices on the first portion of the first mesh to a set of vertices on a portion of the respective mesh that correspond to the first set of vertices on the first portion of the first mesh.

11. The non-transitory computer-readable medium of claim 10 further comprising:
  code for fitting the master topology to the portion of the respective mesh of the plurality of meshes.

12. The non-transitory computer-readable medium of claim 11 wherein the code for fitting the master topology comprises code for receiving input from a user indicative of where to fit the standard topology.

13. The non-transitory computer-readable medium of claim 11 wherein the code for fitting the master topology comprises code for fitting the master topology using one or more fitting procedures or more fitting procedures.

14. The non-transitory computer-readable medium of claim 9 wherein the information defined for the first set of vertices on the portion of the first mesh comprises one or more of point weight groups, shader variables, articulation controls, hair variables, hair styles, or paint data.

15. The non-transitory computer-readable medium of claim 9 further comprising:
  generating, with the processor associated with the computer system, a master rig based on the information defined for the first set of vertices on the first portion of the first mesh; and
  transferring, with the processor associated with the computer system, the information defined for the first set of vertices on the first portion of the first mesh to a plurality of versions of the master rig based on the first topology.

16. The non-transitory computer-readable medium of claim 9 further comprising code for transferring information between the master rig and the plurality of versions of the master rig in a bi-directional manner.

17. A system for sharing information between computer-generated objects, the system comprising:
  a hardware processor; and
  a non-transitory memory configured to store a set of instructions which when executed by the processor configure the processor to:
    receive information specifying a first computer-generated object having a first form;
    generate a first mesh for the first computer-generated object, the first mesh having a first number of vertices interconnected to each other in a first topology to fit the first form, wherein the first topology includes a structure and a level of detail;
    receive information specifying a second computer-generated object having a second form;
    fit the first mesh to the second form of the second computer-generated object to generate a second mesh for the second computer-generated object, the second mesh having the first number of vertices and has the same structure and the same level of detail as the first mesh, and each vertex of the second mesh has a one-to-one correspondence with a respective vertex of the first mesh;
    extract information defined for a first set of vertices on a first portion of the first mesh; and
    transfer the information defined for each respective vertex of the first set of vertices on the first portion of the first mesh to a corresponding vertex of a second set of vertices on a second portion of the second mesh that corresponds to the first portion of the first mesh.

18. The system of claim 17 wherein the processor is further configured to:
  generate a master topology for computer-generated objects based on the first portion of the first mesh; and
  modify a plurality of meshes based on the master topology for a plurality of computer-generated objects having the same type as the first computer-generated object associated with the first mesh;
  wherein to modify each respective mesh of the plurality of meshes the processor is configured to transfer the information defined for the first set of vertices on the first portion of the first mesh to a set of vertices on a portion of the respective mesh that correspond to the first set of vertices on the first portion of the first mesh.

19. The system of claim 18 wherein the processor is further configured to:
  fit the master topology to the portion of the respective mesh of the plurality of meshes.

20. The system of claim 17 wherein the information defined for the first set of vertices on the first portion of the first mesh comprises one or more of point weight groups, shader variables, articulation controls, hair variables, hair styles, or paint data.

* * * * *

UNITED STATES PATENT AND TRADEMARK OFFICE
CERTIFICATE OF CORRECTION

PATENT NO. : 9,947,123 B1
APPLICATION NO. : 14/170835
DATED : April 17, 2018
INVENTOR(S) : Green It is certified that error appears in the above-identified patent and that said Letters Patent is hereby corrected as shown below:

Column 11, Claim 13, Line 60:
Replace "more fitting procedures or more fitting procedures." with --more fitting procedures.--

Signed and Sealed this
Eleventh Day of September, 2018

Andrei Iancu
*Director of the United States Patent and Trademark Office*